US008285442B2

(12) United States Patent
Kohsaka et al.

(10) Patent No.: US 8,285,442 B2
(45) Date of Patent: Oct. 9, 2012

(54) DRIVING RECORDER

(75) Inventors: Hiroji Kohsaka, Kusatsu (JP); Keiko Kohsaka, legal representative, Kusatsu (JP); Masatomo Ishikura, Kyoto (JP); Akihiro Hashimoto, Otsu (JP)

(73) Assignee: Horiba, Ltd., Kyoto (JP)

( * ) Notice: Subject to any disclaimer, the term of this patent is extended or adjusted under 35 U.S.C. 154(b) by 809 days.

(21) Appl. No.: 11/994,103

(22) PCT Filed: Jun. 26, 2006

(86) PCT No.: PCT/JP2006/312690

§ 371 (c)(1), (2), (4) Date: Apr. 17, 2009

(87) PCT Pub. No.: WO2007/004452

PCT Pub. Date: Jan. 11, 2007

(65) Prior Publication Data

US 2009/0306848 A1 Dec. 10, 2009

(30) Foreign Application Priority Data

Jul. 1, 2005 (JP) ................................ P2005-194459
Jul. 1, 2005 (JP) ................................ P2005-194461

(51) Int. Cl.
*G06F 7/00* (2006.01)

(52) U.S. Cl. ..................... 701/33.4; 701/31.4; 701/33.7; 701/33.9

(58) Field of Classification Search .................... 701/33, 701/35, 31.7, 33.4, 33.7, 33.9; 369/21
See application file for complete search history.

(56) References Cited

U.S. PATENT DOCUMENTS 5,948,026 A * 9/1999 Beemer et al. .................. 701/35
5,964,813 A * 10/1999 Ishii et al. ........................ 701/35
6,088,635 A * 7/2000 Cox et al. ......................... 701/19
6,108,598 A * 8/2000 Sumitani ......................... 701/29
6,141,611 A * 10/2000 Mackey et al. ................. 701/35
6,151,541 A * 11/2000 Iizuka ............................. 701/51

(Continued)

FOREIGN PATENT DOCUMENTS

CN 1384008 12/2002

(Continued)

OTHER PUBLICATIONS

Sato et al., Traveling Recorder for Vehicle, Feb. 18, 1994, JPO, JP 06/044430 A, English Abstract.*

(Continued)

*Primary Examiner* — Paul N Dickson
*Assistant Examiner* — James English

(57) ABSTRACT

This invention intends to provide a vehicle-mounted driving recorder that can obtain necessary situation data only surely and accurately and that can contribute to effective use of a memory and to facilitation of an after-the-fact analysis of the situation data. The vehicle-mounted driving recorder comprises a situation data receiving section that receives situation data as being data indicating behavior, a surrounding situation and an operation situation of a vehicle and that temporarily stores the situation data in a temporary data storage section specified in a predetermined area of a memory, and a data administration section, in case that a plurality of contents indicated by the received situation data satisfy a previously specified given condition, that transfers a part or all of the situation data during a certain period before and after a time when the condition is satisfied from the temporary data storage section to the situation data storage section specified in a predetermined area of the memory.

9 Claims, 6 Drawing Sheets

U.S. PATENT DOCUMENTS

| | | | | | |
|---|---|---|---|---|---|
| 6,163,338 | A | * | 12/2000 | Johnson et al. | 348/148 |
| 6,185,490 | B1 | * | 2/2001 | Ferguson | 701/35 |
| 6,246,933 | B1 | | 6/2001 | Bague | |
| 6,246,934 | B1 | * | 6/2001 | Otake et al. | 701/35 |
| 6,266,588 | B1 | * | 7/2001 | McClellan et al. | 701/35 |
| 6,324,450 | B1 | * | 11/2001 | Iwama | 701/35 |
| 6,356,824 | B1 | * | 3/2002 | Chene et al. | 701/35 |
| 7,203,581 | B2 | * | 4/2007 | Okada | 701/35 |
| 7,391,305 | B2 | * | 6/2008 | Knoll et al. | 340/438 |
| 7,965,312 | B2 | * | 6/2011 | Chung et al. | 348/116 |
| 2002/0035422 | A1 | * | 3/2002 | Sasaki | 701/35 |
| 2002/0177931 | A1 | * | 11/2002 | Iwasaki et al. | 701/36 |
| 2003/0033062 | A1 | * | 2/2003 | Nishina | 701/35 |
| 2003/0154009 | A1 | * | 8/2003 | Basir et al. | 701/35 |
| 2004/0113763 | A1 | * | 6/2004 | Bendavid et al. | 340/436 |
| 2005/0131597 | A1 | | 6/2005 | Raz et al. | |
| 2005/0190619 | A1 | | 9/2005 | Wakiyama | |
| 2005/0251297 | A1 | | 11/2005 | Dery et al. | |
| 2006/0184295 | A1 | * | 8/2006 | Hawkins et al. | 701/33 |
| 2008/0161995 | A1 | * | 7/2008 | Nakajima et al. | 701/35 |
| 2010/0318258 | A1 | * | 12/2010 | Katayama et al. | 701/33 |
| 2011/0066317 | A1 | * | 3/2011 | Lee | 701/33 |

FOREIGN PATENT DOCUMENTS

| | | | | |
|---|---|---|---|---|
| CN | 1502093 | | | 6/2004 |
| EP | 1 059 508 | | | 12/2000 |
| EP | 1 548 653 | | | 6/2005 |
| GB | 2 224 358 | | | 5/1990 |
| JP | 60-29753 | | | 2/1985 |
| JP | 63-265383 | | | 11/1988 |
| JP | 1-39245 | | | 11/1989 |
| JP | 05-197858 | | | 8/1993 |
| JP | 06044430 | A | * | 2/1994 |
| JP | 07-249137 | | | 9/1995 |
| JP | 08-169284 | | | 7/1996 |
| JP | 09-050547 | | | 2/1997 |
| JP | 09-231422 | | | 9/1997 |
| JP | 11-183182 | | | 7/1999 |
| JP | 11-298853 | | | 10/1999 |
| JP | 2000-043764 | | | 2/2000 |
| JP | 2000-092420 | | | 3/2000 |
| JP | 2000-171267 | | | 6/2000 |
| JP | 2000-194895 | | | 7/2000 |
| JP | 2001-055175 | | | 2/2001 |
| JP | 2001-124585 | | | 5/2001 |
| JP | 2001-236537 | | | 8/2001 |
| JP | 2003-168882 | | | 6/2003 |
| JP | 2003-252256 | | | 9/2003 |
| JP | 2004-064634 | | | 2/2004 |
| JP | 2004-064934 | | | 2/2004 |
| JP | 2004-075033 | | | 3/2004 |
| JP | 2004-240828 | | | 8/2004 |
| JP | 2004-318912 | | | 11/2004 |
| JP | 2004-345599 | | | 12/2004 |
| JP | 2005-500931 | | | 1/2005 |

OTHER PUBLICATIONS

Chinese Application No. 201010206533.7 Office Action dated Feb. 15, 2011, 3 pages.

Japanese Application No. 2005-194461 Office Action dated Jul. 5, 2011, 2 pages.

Chinese Application No. 201010206523.3 Office Action dated May 20, 2011, 3 pages.

European Application No. 06767617.1 Extended Search Report dated Oct. 6, 2011, 9 pages.

European Application No. 06767307.9 Extended Search Report dated Jul. 5, 2011, 2 pages.

Japanese Application No. 2005-194461 Notice of Allowance dated Aug. 7, 2012, 3 pages.

* cited by examiner

DRIVING RECORDER

FIELD OF THE ART

This invention relates to a driving recorder that records behavior, a surrounding situation or the like of a motor vehicle during a certain period before and after a time of an accident or a hiyari-hatto, in other words, a case when a driver feels chill because he or she is close to be involved in an accident even though this situation does not reach an accident in case an accident occurs or a driver feels chill because of the above reason, and that can preferably makes an after-the-fact analysis why the motor vehicle gets involved in the situation.

BACKGROUND ART

Recently, a vehicle-mounted driving recorder has been developed that can automatically record an image of outside or inside of a motor vehicle (an automobile) during driving and that can make an after-the-fact analysis on an objective situation at a time of an accident or hiyari-hatto, and there is a trend that this kind of a driving recorder is mounted on, for example, a taxicab in order to prevent an accident by making the after-the-fact analysis on an ordinary driving or to investigate an objective evidence of a cause of the accident when the accident occurs.

Concretely, the driving recorder of this type is mounted on a vehicle, and so arranged to sequentially and chronologically store situation data such as outside image data, acceleration data, speed data and position data while the vehicle is driving in a memory so that an after-the-fact analysis can be made by reference to the situation data stored in the memory.

It is often difficult to store all of the situation data during driving due to the capacity of the memory, although it depends on duration of driving. When a capacity of the memory runs out, it stops to write the situation data, resulting in failure of recording the latest situation data.

Then, conventionally known are an arrangement of, so-called a ring-buffer memory method, wherein the oldest situation data is updated in sequence when the capacity of the memory runs out, and an arrangement wherein, a hiyari-hatto, an accident or an abnormality is considered to occur at a time when acceleration (deceleration) of the vehicle shows above a certain numerical value, the situation data alone during a certain period before and after the time of the event is recorded in a nonvolatile memory to use the situation data for after-the-fact analysis from a temporary memory (refer to the patent document 1).

With the ring-buffer memory method, however, there is a case that necessary situation data is buried in the updated data and deleted. For example, in case of an accident, since there would be no chance that the vehicle continues to run any more, necessary situation data is considered to be included in the latest situation data so that it would not be a big problem. In case of a hiyari-hatto, however, necessary situation data to prevent the accident might be buried in the old situation data and deleted. As a result, the ring-buffer memory method is not preferable.

In addition, with the method of judging by the use of the acceleration, since a lot of unnecessary situation data in case of other than an accident or hiyari-hatto (in case of just opening or closing a door, or quick acceleration or deceleration due to a driver's driving preference) is obtained, a capacity of a memory runs out in a short time and it becomes very troublesome to select unnecessary situation data after the event.

A driving recorder that selects and stores only the situation data whose importance is high in a recording media generally uses acceleration data as a trigger for detection and the situation data before and after a time when the acceleration is detected in case the acceleration is bigger than a certain level is stored in the recording media (Patent document 1).

If situation data is selected by the use of the acceleration data as a trigger for detection, however, the situation data is likely to be selected and stored at a time when the trigger for detection reacts to the acceleration generated just due to a bump on a road, a movement of opening or closing the door or pressing a brake pedal. In this case, there is a problem that it becomes difficult to analyze the situation data after the event because the situation data whose importance is low is also recorded and stored massively and there is also a problem that it becomes impossible to store the situation data whose importance is high because a recording media is filled with the situation data whose importance is low.

Patent document 1: Japan patent laid open number 5-197858

DISCLOSURE OF THE INVENTION

Problems to be Solved by the Invention

The present claimed invention intends to solve a problem that old situation data or new situation data is not recorded because a capacity of a memory runs out and its main object is to provide a vehicle-mounted driving recorder that can obtain necessary situation data only surely and accurately and that can contribute to effective use of a memory and to facilitation of an after-the-fact analysis of the situation data, or to provide a driving recorder that has a learning function and that can select the situation data with high accuracy.

Means to Solve the Problems

More specifically, the vehicle-mounted driving recorder in accordance with this invention is characterized by comprising a situation data receiving section that receives situation data as being data indicating behavior, a surrounding situation, an operation situation or the like of a vehicle and that temporarily stores the situation data in a temporary data storage section specified in a predetermined area of a memory, and a data administration section, in case that a plurality of contents indicated by the received situation data satisfy a previously specified given condition, that transfers a part or all of the situation data during a certain period before and after a time when the condition is satisfied from the temporary data storage section to the situation data storage section specified in a predetermined area of the memory.

In accordance with the driving recorder of the above-mentioned arrangement, since a case that seems to be an accident or a hiyari-hatto is specified based on multiple contents shown by the situation data and the situation data during a certain period before and after the case is formally stored (can be said as recorded), it is possible to judge whether or not the case is the accident or the hiyari-hatto with extreme accuracy.

As a result of this, it is possible to effectively utilize the memory by avoiding storing useless situation data. In addition, since useless situation data is omitted at a time of recording, it is also possible to produce an effect of facilitating an after-the-fact analysis.

In addition, a vehicle-mounted driving recorder in accordance with the present claimed invention is characterized by comprising a situation data receiving section that receives situation data as being data indicating behavior, a surrounding situation, an operation situation or the like of a vehicle and that temporarily stores the situation data in a temporary data storage section specified in a predetermined area of a memory, an acceleration sensor that detects acceleration applied to the vehicle and that outputs acceleration data indicating the acceleration as one of the situation data, and a data administration section that calculates a peak value of the acceleration and a value regarding its time integral value and, in case that each calculated value exceeds each previously determined criterion value, that transfers a part or all of the situation data during a certain period before and after a time when the acceleration is applied from the temporary data storage section to a situation data storage section specified in a predetermined area of the memory. The acceleration may be an absolute value, and may include deceleration.

In accordance with the driving recorder of this arrangement, since a case that seems to be an accident or a hiyari-hatto is specified based on not only a peak value of the acceleration like a conventional recorder but also a value regarding a time integral value of the acceleration (not only a time integral value of a time series waveform of an acceleration but also a value indirectly indicating the time integral value including, for example, a period while an acceleration exceeding a certain level continues) and the situation data during the certain period is recorded, it is possible to judge whether or not the case is the accident or the like more accurately compared with a case wherein judgment is based on the peak value of the acceleration only.

As a result of this, like the above-mentioned, it is possible to effectively utilize the memory by avoiding storing useless situation data. In addition, since useless situation data is omitted at a time of recording, it is also possible to produce an effect of facilitating an after-the-fact analysis.

In addition, a vehicle-mounted driving recorder in accordance with this invention comprises an auxiliary electric power source so that electric power can be supplied by the auxiliary electric power source in case the electric power supplied from an electric power source at a side of a vehicle is halted, and is characterized by comprising a situation data receiving section that receives situation data as being data indicating behavior, a surrounding situation, an operation situation or the like of a vehicle and that temporarily stores the situation data in a temporary data storage section specified in a predetermined area of a memory, in case that it is judged that the electric power supplied from an electric power source at the side of the vehicle is halted based on a content of main electric power source state data belonging to the situation data and indicating whether or not the electric power is supplied from the electric power source at the side of the vehicle, and a data administration section that transmits the situation data during a certain period before and after a time when the electric power supply is halted from the temporary data storage section to a situation data storage section specified in a predetermined area of the memory.

In accordance with the driving recorder of the above-mentioned arrangement, since the electric power is supplied from the auxiliary electric power source in case that the electric power supplied from the vehicle is halted at a time when the vehicle gets broken due to a serious accident, it is possible for the driving recorder to continue recording the situation data. In addition, since the driving recorder records the situation data during the certain period before and after the time when the electric power supply is halted by the use of the point of the time as a trigger, it is possible to obtain the situation data especially at a time of an accident more reliably than a driving recorder that judges whether or not the situation data is to be recorded by the use of the peak value of the acceleration only.

Conventionally in case of a taxicab, the situation data is stored in a detachable nonvolatile memory (a CF memory card or the like) and the nonvolatile memory is pulled out from the recorder and then loaded on a center computer in a vehicle allocating center, for example, after the completion of work so as to transfer the situation data into a memory in the center computer. However, with this arrangement, there might be a case that the situation data in the CF memory card is updated at a time of a next driving due to a human error such as forgetting the operation of pulling out the memory.

In order to solve the problem, it is preferable to further comprise a communication device that radio-transmits the situation data in the situation data storage section to a center computer arranged at a place different from the place where the vehicle locates at a time when the vehicle locates in a specified place where radio-communication to the center computer is capable.

As an especially effective situation data for making an after-the-fact analysis on a content of an accident or a hiyari-hatto, it can be represented by that at least acceleration data indicating acceleration applied to the vehicle, position data indicating a position of the vehicle and moving image data indicating an outside picture of the vehicle are included as the situation data.

In addition, in order to judge whether or not the situation is the accident or the hiyari-hatto more accurately, it is preferable that at least one or all of speed data indicating a speed of the vehicle, brake data indicating whether a brake of the vehicle is applied or not, door open/close data indicating whether a door is open or closed and main electric power source situation data indicating whether or not electric power is supplied from an electric power source at a side of the vehicle is further included as the situation data.

Furthermore, a vehicle-mounted driving recorder in accordance with this invention comprises a detection device that detects a situation of a vehicle, a data administration section that determines the situation of the vehicle detected by the detection device, a judgment criterion parameter storage section that stores data of a parameter to be a criterion for judging the situation in the data administration section, an alert device that informs the driver that the situation is judged to exceed the judgment criterion by the data administration section, and an input device that inputs whether or not the judgment by the data administration section is appropriate, and is characterized by that the judgment criterion parameter storage section updates the data of the parameter based on whether or not the input is made by the input device.

In accordance with this arrangement, every time the driver transmits a judged result whether or not the judgment in the data administration section is appropriate through a manual switch as being the data administration section, the data of the parameter, as being a judgment criterion in the data administration section, stored in the judgment criterion parameter storage section is updated based on the judged result. As the data of the judgment criterion parameter is updated, the accuracy for judgment of the data administration section is improved, so that the situation data regarding an event whose importance is low is not selected. As a result of this, it is possible to prevent a case wherein the driving recorder fails recording the situation data regarding the event whose importance is high such as an accident or a serious driving miss due to a reason that the driving recorder is filled with the situation data regarding the event whose importance is low such as just a bump on a road, opening or closing a door and pressing a brake pedal. In addition, since the situation data regarding an event whose importance is low is prevented from being stored, it is possible to decrease the time required for data analysis.

Furthermore, in order to decrease the time required for analyzing the situation data recorded in the driving recorder in accordance with this invention, it is preferable for the driving recorder in accordance with this invention to comprise a situation data storage section that stores the situation data of the vehicle is so arranged to classify the situation data of the vehicle based on whether or not the input is made by the input device and to store the classified situation data of the vehicle. In accordance with this arrangement, since the situation data whose importance is low is stored separately from the situation data whose importance is high, it is possible to analyze the situation data by selecting only the necessary situation data.

In case of an event whose importance is high such as a crash accident or a serious driving miss, the acceleration is more likely to change. As a result, the acceleration detected by an acceleration sensor is preferably used as a trigger to select the situation data of the vehicle.

Effect of the Invention

In accordance with this invention, the vehicle-mounted driving recorder can surely and correctly obtain only the necessary situation data so as to contribute to effective use of a memory and to facilitation of after-the-fact analysis of the situation data. In addition, the result judged by the driver concerning the judgment in the data administration section is transmitted through the input device, and the data of the parameter stored in the judgment criterion parameter storage section is updated based on the judged result. As a result, as the judgment in the data administration section and the driver's judgment concerning the judgment are repeated, the accuracy for judgment of the data administration section is improved. Since the situation data whose importance is low is prevented from being accumulated in the driving recorder, it is possible to effectively utilize the memory capacity and also to decrease the time required for data analysis.

EXPLANATION OF THE REFERENCE NUMERAL

Figure 1:
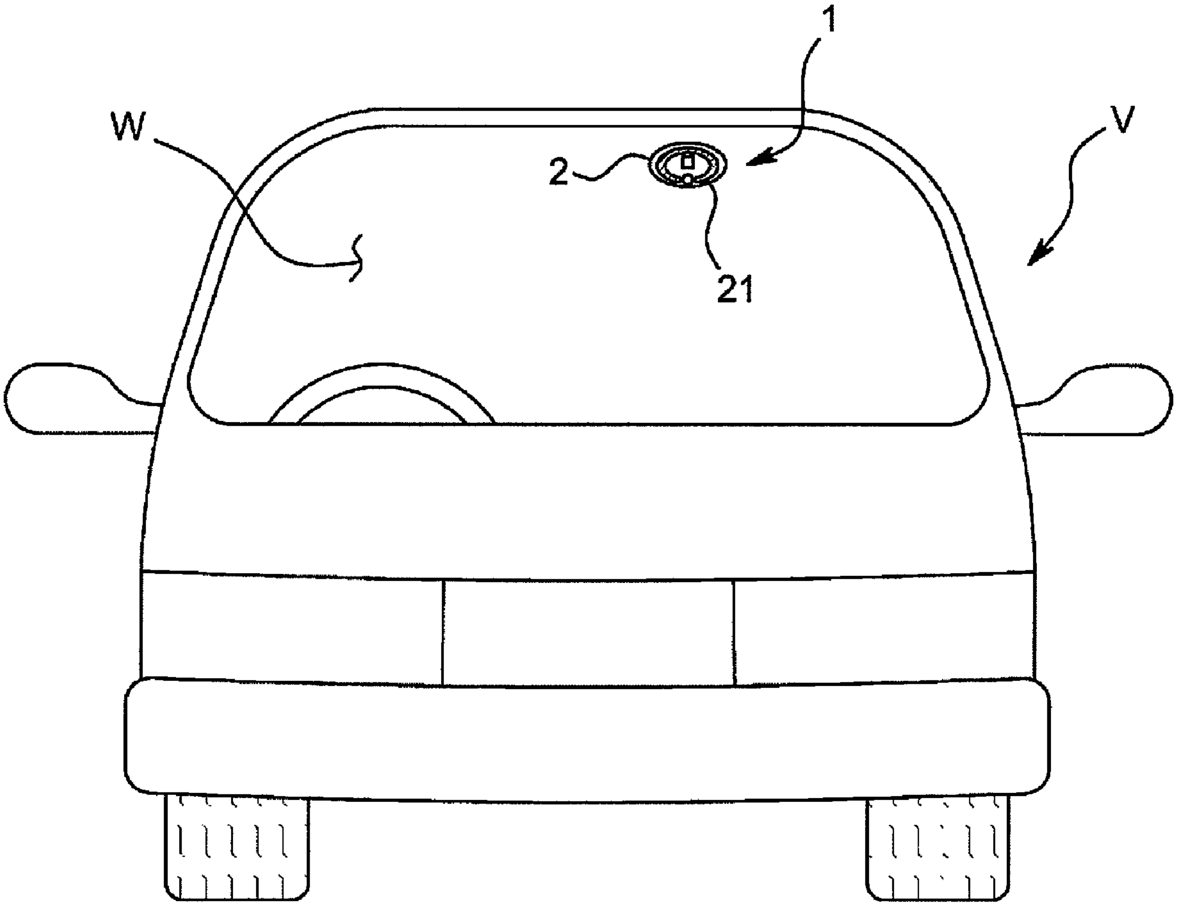
FIG. 1 is a pattern front view showing a case that a driving recorder in accordance with an embodiment of the invention is mounted on a vehicle.

1 . . . driving recorder, 3 . . . detection device, 32 . . . acceleration sensor, 801 . . . data receiving section, 802 . . . temporary data storage section, 803 . . . situation data storage section, 804 . . . data administration section, 9 . . . auxiliary electric power source

BEST MODES OF EMBODYING THE INVENTION

An embodiment of the present claimed invention will be described with reference to the accompanying drawings.

A driving recorder 1 in accordance with this embodiment is, as shown in FIG. 1 through FIG. 5, to record behavior, a surrounding situation, an operation situation or the like of a motor vehicle V during a certain period before and after a time of an accident or a hiyari-hatto, in other words, a time when a driver feels chill because he or she is close to be involved in an accident, and comprises a single casing 2, a detection device 3, an alert device 4, an input device 5, a communication device 6, a removable recording device 7, an information processing device 8 and an auxiliary electric power source 9 held by the casing 2. The driving recorder 1 is attached to an arbitrary place on an automobile windshield W through an adhesive pad 21 having predetermined heat conductivity.

Next, each part will be described.

Figure 2:
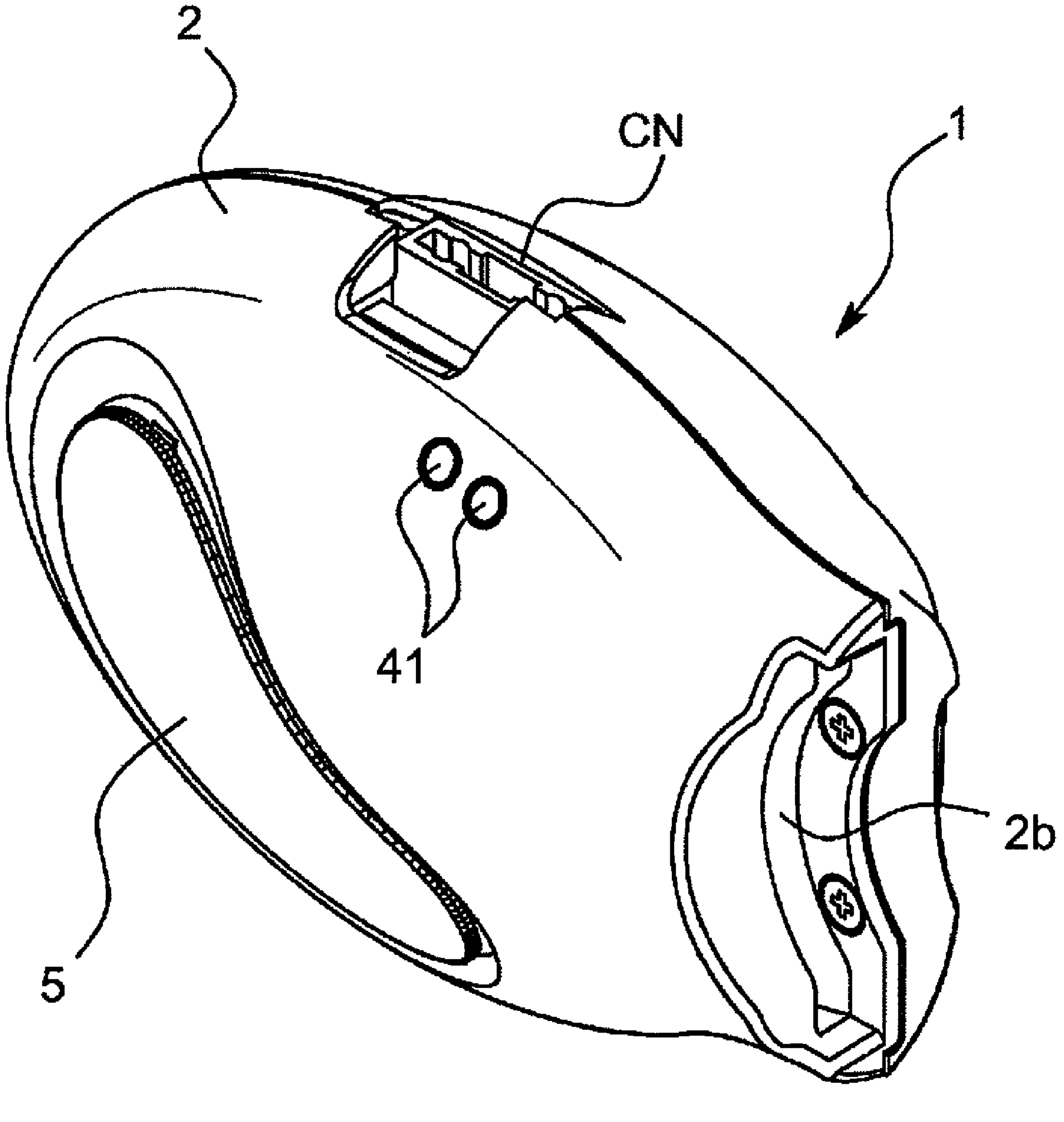
FIG. 2 is a perspective view of the driving recorder in accordance with this embodiment viewed from inside of the vehicle.
Figure 3:
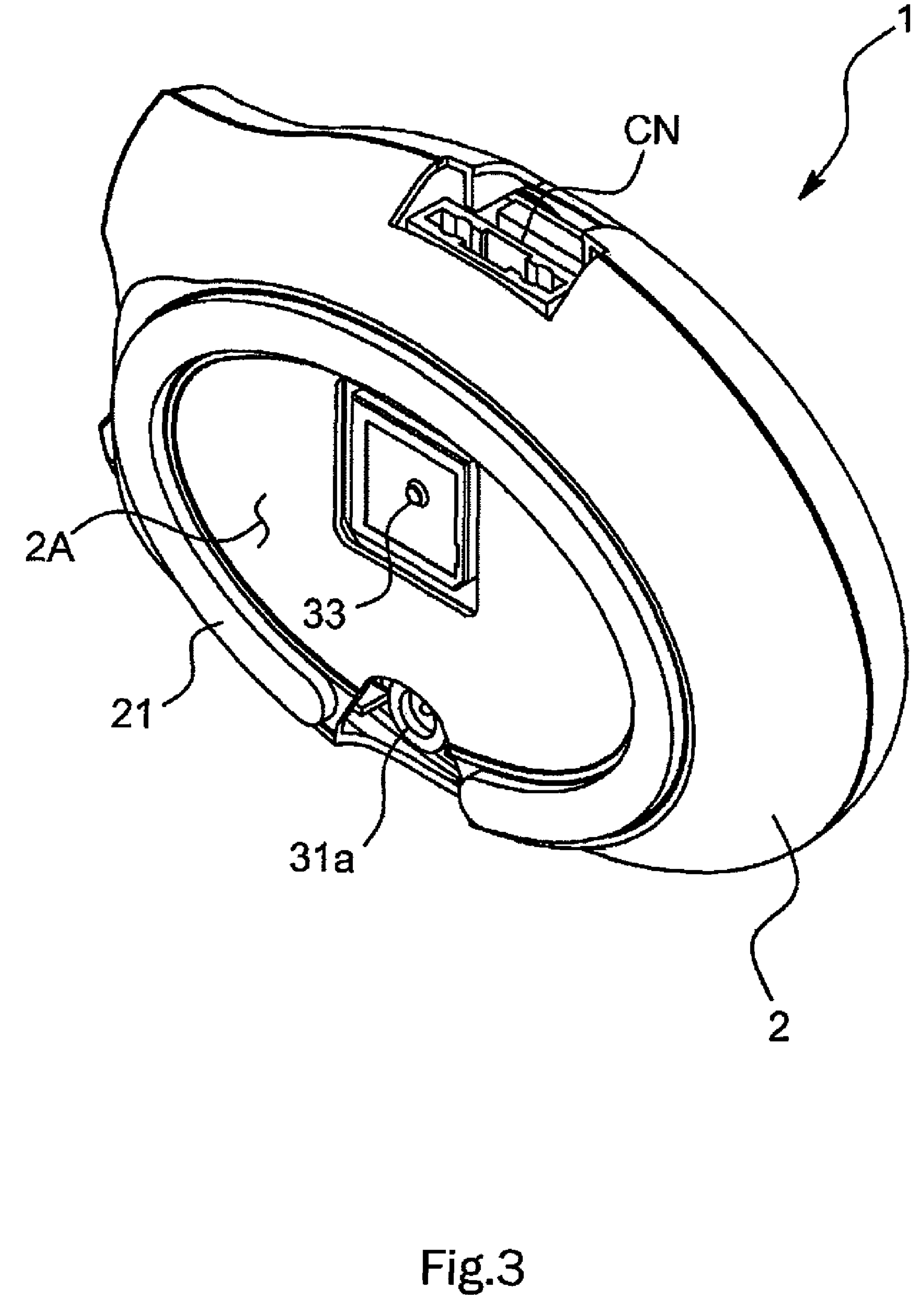
FIG. 3 is a perspective view of the driving recorder in accordance with this embodiment viewed from outside of the vehicle.

The casing 2 is, as shown in FIG. 2 and FIG. 3, of a generally egg-shaped form almost all of which is made of a metal (a magnesium alloy), wherein a flat surface part 2A of a generally elliptical shape formed by cutting a part of the egg-shaped form with a flat surface is arranged in a part of the casing 2 and an outer circumferential edge part of the flat surface part 2A is attached to the automobile windshield W through the adhesive pad 21 of a generally elliptic zonation having adherence and elasticity.

Figure 4:
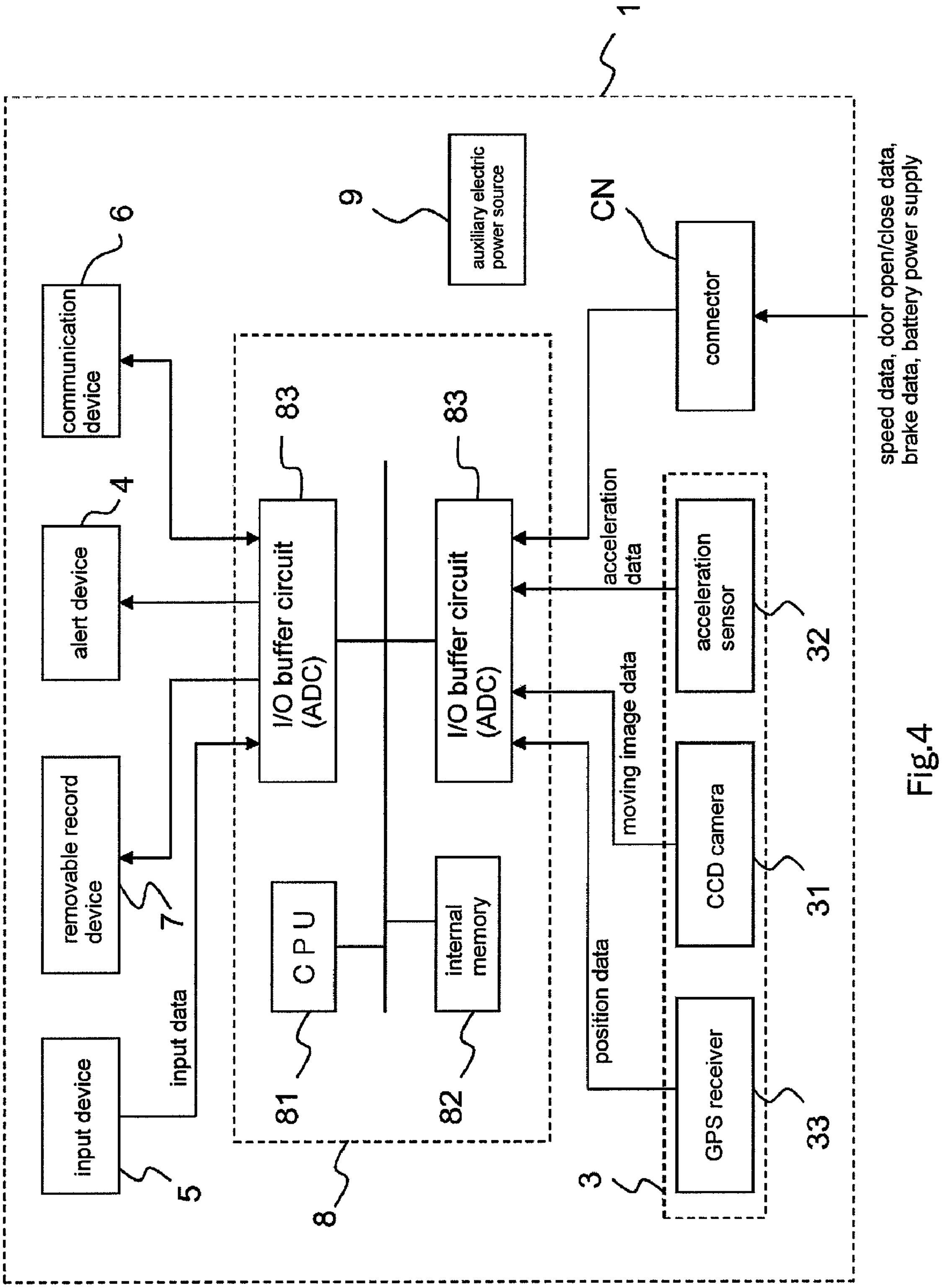
FIG. 4 is a pattern structural view of the driving recorder in accordance with this embodiment.

The detection device 3, as shown in FIG. 4, senses the behavior, the surrounding situation, the operation situation or the like of the motor vehicle V and outputs situation data indicating contents of the behavior, the surrounding situation, the operation situation or the like. The detection device 3 uses at least a CCD camera 31 as being an imaging device, an acceleration sensor 32 and a GPS receiver 33 as being a position sensor. In this embodiment the acceleration data detected by the acceleration sensor 32 will be explained as an example of the data detected by the detecting sensor 3.

The CCD camera 31 takes an image of a situation of outside the vehicle V and outputs situation data indicating the image (the moving image data), and an image reception area 31*a* is exposed to the casing flat surface part 2A that faces the automobile windshield W. The image reception area 31*a* is movable so that it can be set to face to a desired direction to take the image in accordance with a position, on which the CCD camera 31 is mounted, of the automobile windshield W.

The acceleration sensor 32 is of an arrangement that makes use of, for example, a Piezoresistance effect, and senses acceleration of one dimension to three dimensions (back and front, right and left, up and down, for example, in case of three dimensions) that applies to the motor vehicle V and outputs the situation data (the acceleration data) indicating its acceleration.

The GPS receiver 33 catches electromagnetic waves from, for example, multiple satellites (artificial satellites), senses a position of the motor vehicle V on which the driving recorder 1 is mounted and outputs situation data (position data) indicating the position of the motor vehicle V. A part of the GPS receiver 33 is exposed to, for example, the casing flat surface part 2A.

As the situation data there are vehicle speed data transmitted from a vehicle speed sensor (not shown in drawings) of the motor vehicle V, door open/close data indicating an opening and closing of a door, or brake data indicating ON/OFF of a brake. The data is received through a connector CN.

Furthermore, the driving recorder 1 is generally activated by the electric power supplied from a vehicle battery (an electric power source at a side of the vehicle, not shown in drawings) through the connector CN. In case that electric power supplied from the vehicle battery becomes scarce due to some cause (in case that the battery gets damaged due to a crash accident or the like), the electric power supply source to the driving recorder 1 is automatically switched to the auxiliary electric power source 9 and the auxiliary electric power source 9 supplies the electric power enough to activate the driving recorder 1 at the minimum during at least the certain period. This makes it possible to record the situation data of the vehicle. Then whether the electric power is supplied from the battery of the vehicle or not is input as main electric power source state data as being one of the situation data to the information processing device 8, to be described later.

The alert device 4 comprises, as shown in FIG. 2, LEDs 41 as being an illuminant exposed to an opposite side of the casing flat surface part 2A and a sound output body (not shown in drawings) such as a buzzer or a speaker built-in the casing 2. For example, if a judged result that the acceleration detected by the acceleration sensor 32 exceeds a predetermined criterion is transmitted from the data administration section 804, the alert device 4 reports the judged result to a driver by means of light or sound.

In this embodiment, the input device 5 is a button switch (a manual switch) exposed to an opposite side of the casing flat surface part 2A. In case that the driver, who is reported that the acceleration exceeding a predetermined criterion is detected by means of the light or sound emitted by the alert device 4, judges that the acceleration is caused not by an event whose importance is high such as an accident or a serious driving mistake but by an event whose importance is low such as a bump on a road, opening or closing the door or pressing a brake pedal, the driver turns on the alert device 5 (input by the input device) so as to transmit that the acceleration is caused by the event whose importance is low to the data administration section 804.

The communication device 6 is hardware for wireless LAN that is built-in the casing 2 and that sends and receives various data by means of a center computer (not shown in drawings) arranged in a vehicle allocating center and the electromagnetic waves.

In this embodiment, the removable recording device 7 is a CF memory card detachably mounted on a slot 2*b* opening toward a lateral side of the casing 2 and records the situation data stored in the situation data storage section 803 if required.

Figure 5:
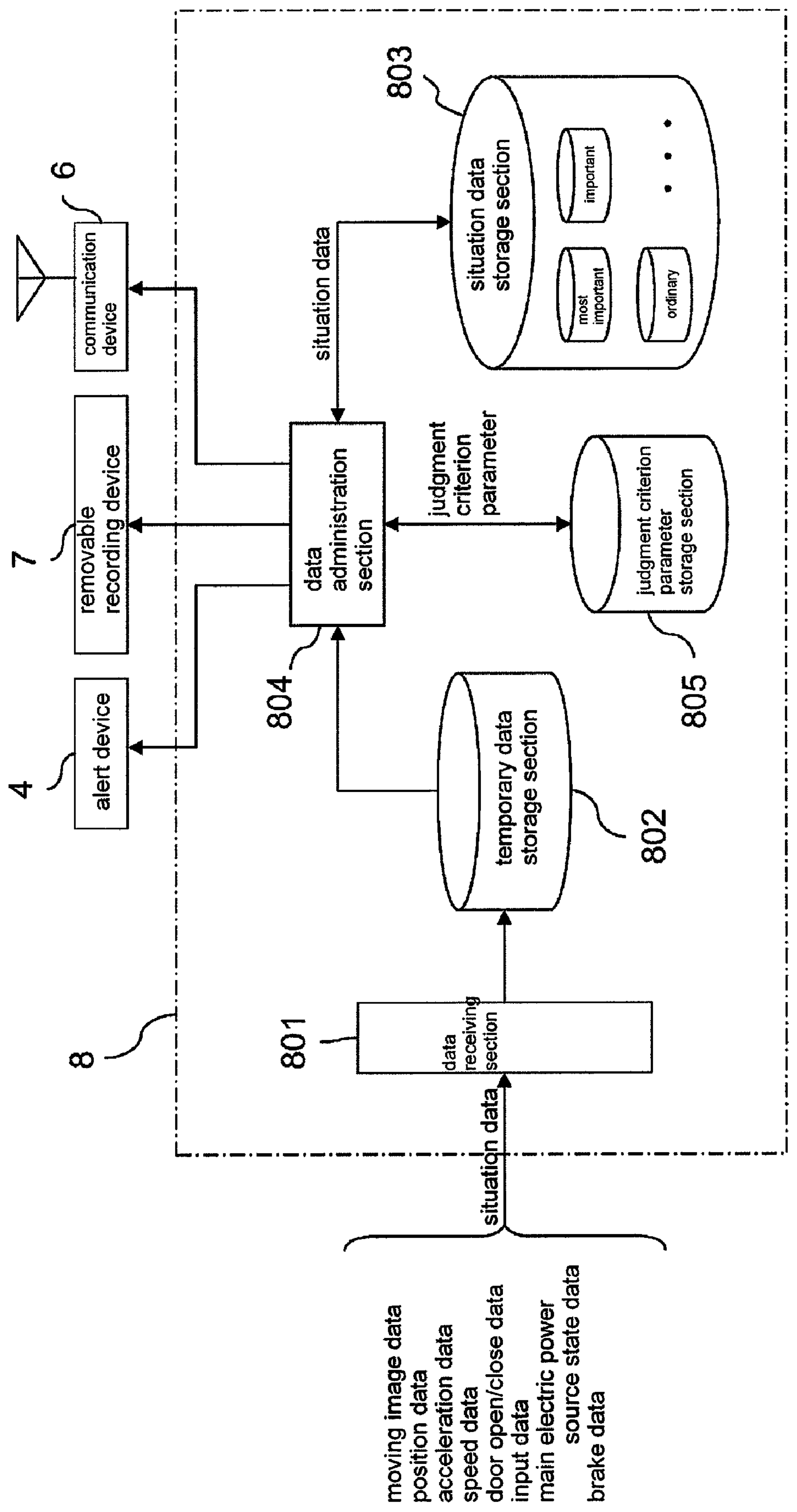
FIG. 5 is a functional block diagram of an information processing device in accordance with this embodiment.

The information processing device 8 is, as shown in FIG. 4, structurally a so-called computer circuit that is built-in the casing 2 and that has a CPU 81, an internal memory 82 (for example, a nonvolatile memory) and an I/O buffer circuit 83 (there might be a case that an AD converter is included). As shown in FIG. 5, each device is controlled or information processed by operating the CPU 81 in accordance with programs stored in a predetermined area of the internal memory 82, and functions as a data receiving section 801, a temporary data storage section 802, a situation data storage section 803, a data administration section 804 and a judgment criterion parameter storage section 805.

The data receiving section 801 receives the situation data as being data regarding the behavior, the surrounding situation or the like of the motor vehicle V at a constant sampling time one after another in a chronological order from the detection device 3 and writes the received situation data one after another in the temporary data storage section 802 specified in a predetermined area of the internal memory 82. If a capacity of the temporary data storage section 802 runs out, old data is sequentially erased and new situation data is written in the temporary data storage section 802 instead.

Furthermore, the data receiving section 801 is so arranged to receive the data from a vehicle speed meter incorporated in the vehicle or from the door, and the data is received through the connector CN. In addition, the connector CN is also used for the electric power source.

The situation data storage section 803 classifies and stores the situation data of the vehicle received through the data administration section 804 and stored in the temporary data storage section 802 into the most important folder, an important folder and an ordinary folder in a descending order in accordance with the importance.

The data administration section 804 judges whether or not the content of the situation data stored in the temporary data storage section 802 meets the predetermined condition. Only in a case that the content meets the predetermined condition, the situation data during a certain period before and after the situation data whose content meets the predetermined condition is transferred from the temporary data storage section 802 to the situation data storage section 803 arranged in a predetermined area of the internal memory 82 or/and the removable recording device 7.

In this embodiment, a judgment criterion parameter that is arranged to correspond to each situation data is used in order to judge whether or not the content meets the predetermined condition. The judgment criterion parameter is stored in advance in the judgment criterion parameter storage section 805 arranged in a predetermined area of the internal memory 82.

Then the value (the content) of each situation data is, for example, digitalized in accordance with the judgment criterion parameter. Concretely, all of whether or not the acceleration (deceleration) exceeds a predetermined judgment criterion, whether or not the acceleration continues for more than or equal to a certain period, whether or not the door is open, whether or nor the electric power is supplied from the battery, whether or not the speed of the vehicle exceeds the predetermined upper limit speed, whether or not the speed of the vehicle is not over the predetermined lower limit speed and whether or not the brake is applied are digitalized.

Later, whether or not the content of each situation data meets the predetermined condition is judged based on results of the digitalized values on which a logical operation such as an AND/OR operation is performed. Some may be judged by combining a content of the situation data with a content of other situation data depending on the variety or the content of the situation data and some may be judged based on a content of a single situation data. For example, in this embodiment, if the electric power is not supplied from the battery, it is instantly judged based on the single event that the predetermined condition is satisfied. If the door is open, it is also instantly judged based on the single event that the predetermined condition is satisfied. Meanwhile, concerning the acceleration, it is judged that the predetermined condition is satisfied at a time when two events are satisfied; both the acceleration data exceeds the predetermined judgment criterion and the acceleration data continues over a certain period.

In this embodiment, in case that it is judged the predetermined conditioned is satisfied (in case that it is judged a hiyari-hatto or an accident occurs), the data administration section 804 reports the driver about this event by means of light or sound from the alert device 4 and verifies the judgment by means of, for example, input data (this is also one of the situation data) from the driver with an operation of ON/OFF of the button switch 5. The driver can input that the accident or the hiyari-hatto occurs by voluntarily pushing the button switch 5, even though there is no report from the alert device 4.

The judgment criterion parameter storage section 805 stores data of each parameter to be a criterion for judging the acceleration in the data administration section 804, for example, data of each parameter such as a magnitude of the acceleration or a period while the acceleration continues and updates the data as a learning function, to be described later, in case the manual switch 5 is turned on.

Due to this learning function, accuracy for judgment of the data administration section 804 is improved as the data stored in the judgment criterion parameter storage section 805 is repeatedly updated, and then only the acceleration caused by the event whose importance is high is selected.

Then the situation data during a certain period is transferred from the temporary data storage section 802 to the situation data storage section 803 only after the driver judges the situation as the hiyari-hatto or the accident and pushes the button switch 5 and then the data administration section 804 receives the input data indicating that the hiyari-hatto or the accident occurs. The difference between the temporary data storage section 802 and the situation data storage section 803 is; the temporary data storage section 802 temporarily stores the situation data irrespective of the contents of the situation data and the situation data storage section 803 stores the situation data for the record basically without updating the situation data and in case that the situation data is updated, it is after the situation data is transferred to other record device (for example, the detachable record device 7).

In addition, in this embodiment, the data administration section 804 further has a learning function that learns and updates a content of a predetermined condition, a classificatory function that classifies the situation data stored in the situation data storage section 803 in accordance with a type or a level of importance of the situation, and an automatic radio transmission function that automatically radio-transmits the situation data to a center computer (not shown in drawings) through the communication device 6.

The learning function is a function to grasp a driving preference of the driver and to update the predetermined condition by conducting feedback, in case that the predetermined condition is judged to be satisfied and in case that the input from the driver is inconsistent with the actual condition. More concretely, the learning function is to update a value of the judgment criterion parameter or the logical operational expression such as the AND/OR operation. For example, if a driver tends to press a brake pedal hard, a situation usually judged as the hiyari-hatto can be considered as an ordinary driving because a value of the judgment criterion parameter relating to the acceleration gradually gets higher than a default value due to this learning function, thereby eliminating accumulation of useless data.

The data classificatory function is a function to weight the situation data during a certain period to be recorded based on the content of the situation data at a time of recording and to classify, organize and store the situation data into folders (classifications) arranged in the situation data storage section 803 in the order of the importance of the record, for example, the most important, important and ordinary. As one example, in case that the vehicle V makes a quick stop without putting on a brake, it is considered that a probability of the accident is extremely high, and then the situation data during a certain period before and after the time of the event is recorded in a file of, for example, the most important. In addition, in case that the driver voluntarily pushes the button switch 5, the situation data is also recorded in the folder of the most important. Furthermore, for example, if acceleration that exceeds a certain level continues for more than a certain period and then driving is restarted without opening or closing the door, there is a probability of a hiyari-hatto and then the situation data before and after this time is recorded, for example, in the important folder.

In case that the capacity of the situation data storage section 803 runs out, the situation data whose importance is lower than the importance of new situation data is automatically erased and the new situation data is recorded instead.

The automatic radio transmission function is used for, for example, taxicabs or buses in an especially effective manner. More specifically, in case that the motor vehicle V is at a specified place such as a vehicle allocating center, the automatic radio transmission function automatically or manually opens a wireless line to a center computer in the vehicle allocating center and transmits the situation data in the situation data storage section 803 in association with the motor vehicle V or an identifier of a driver of the motor vehicle V through the communication device 6.

Next, an operation of the driving recorder regarding the automatic learning function will be explained with reference to the flow chart in FIG. 6.

Figure 6:
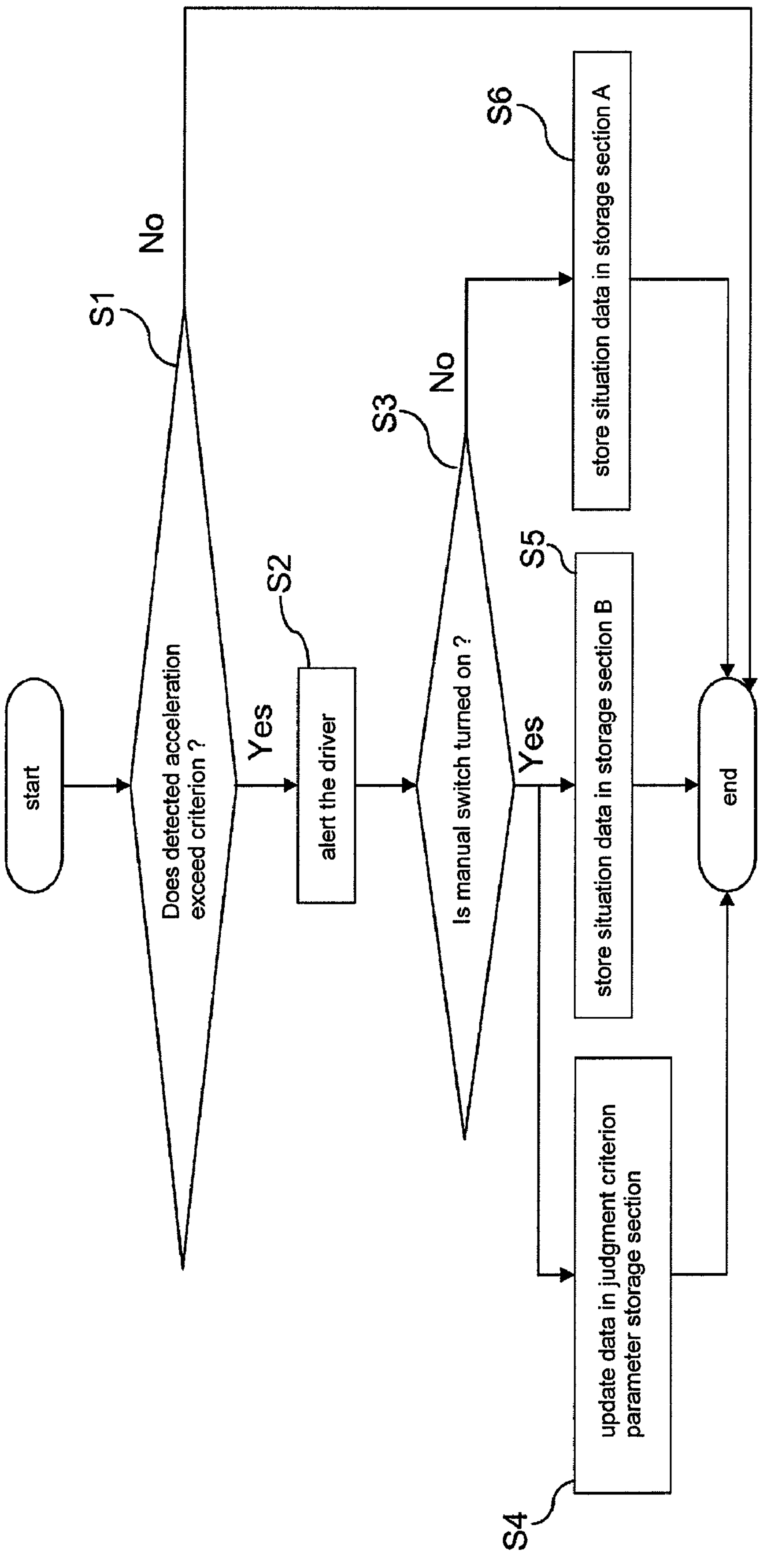
FIG. 6 is a flow chart showing a performance of the driving recorder in accordance with this embodiment in case that the acceleration is detected.

As shown in FIG. 6, when the acceleration sensor 32 detects the acceleration, it is judged whether or not the acceleration detected by the data administration section 804 exceeds the judgment criterion (step S1). If it is judged that the detected acceleration exceeds the judgment criterion, the data administration section 804 transmits a signal to the alert device 4 to notify the driver and then the alert device 4 alerts the driver about that the acceleration exceeding the criterion is detected by means of light or sound (step S2).

In case that the alerted driver judges that the acceleration is caused by an event whose importance is low such as just a bump on a road, opening or closing a door or pressing a brake pedal, the driver turns on the manual switch 5. In case that the alerted driver judges that the acceleration is caused by an event whose importance is high such as an accident or a serious driving miss, the driver does not turn on the manual switch 5.

The data administration section 804 judges whether or not the manual switch 5 is turned on (step S3). In case that it is judged the manual switch 5 is turned on, the data in the judgment criterion parameter storage section 805 is updated and the judgment criterion in the data administration section 804 is changed (step S4) and the situation data before and after a time when the acceleration is detected, including the situation data at this time, is stored in the folder whose importance is low (for example, an ordinary folder (storage section B)) of the situation data storage section 803 (step S5).

In case that it is judged the manual switch 5 is not turned on, the situation data before and after the time when the acceleration is detected, including the situation data at this time, is stored in the folder whose importance is high (for example, the most important folder (storage section A)) of the situation data storage section 803 (step S6).

In accordance with the driving recorder 1 of the above arrangement, since the case considered to be the accident or the hiyari-hatto is judged based on multiple contents shown by each situation data and a sequence of the situation data during a certain period after and before this case is stored (recorded) only in this case, it is possible to avoid useless situation data appropriately compared with a case wherein all of the situation data is stored or a case wherein the accident or the hiyari-hatto is judged based on a single content among the contents of the situation data. As a result, it is possible to effectively utilize the memory. In addition, since the useless situation data is omitted, it is possible to obtain an effect that the after-the-fact analysis becomes easy.

Furthermore, since the driving preference at a time of the accident or the hiyari-hatto is learned individually in accordance with a driver's characteristics and a predetermined condition data as being a criterion for judgment is updated based on the learned driving preference, it is possible to eliminate useless situation data and to obtain the situation data at a time of the accident or the hiyari-hatto without fail compared with a case that the predetermined condition data is defined uniformly.

In addition, since the situation data in the situation data storage section 803 at a time when the vehicle V locates at a specified place is automatically transmitted to and stored in the other center computer by the automatic radio transmission function, it is possible to prevent loss of the situation data due to forgetting pulling out the detachable record device 7, and also possible to eliminate the use of the detachable record device 7 itself depending on a case-by-case basis.

Furthermore, since the situation data is automatically classified in the order of importance and stored in the situation data storage section 803 by the data classificatory function, it is possible to conduct an after-the-fact analysis extremely smoothly by transmitting the classified situation data to, for example, a center computer and analyzing them. Furthermore, in case that the capacity of the situation data storage section 803 runs out, the situation data whose importance is lower is updated in turn and the situation data whose importance is higher remains, which makes it possible to effectively use the memory.

In addition, especially regarding the automatic learning function, every time the data administration section 804 selects the acceleration caused by an event whose importance is low such as a bump on a road, opening or closing a door or pressing a brake pedal, the parameter data to be a judgment criterion stored in the judgment criterion parameter storage section 805 is updated (for example, a criterion value of magnitude of the acceleration is set again to be higher, a period while the acceleration continues is set again to be longer, or weighting of the parameter is changed), and judgment is made based on the updated latest parameter data as update is repeatedly. Then a chance of selecting the acceleration caused by the event whose importance is low by the data administration section 804 decreases so that the accuracy for judgment is improved. As a result, it is possible to prevent the situation data regarding the event whose importance is low such as just a bump on a road, opening or closing a door and pressing a brake pedal is stored in the situation data storage section 803, and also possible to prevent a case of failing to record the situation data regarding the event whose importance is high such as an accident necessary to be stored or an important driving miss because the situation data storage section 803 is filled with the situation data whose importance is low. In addition, even though the situation data whose importance is low is stored, since the situation data whose importance is high is stored in the most important folder and the situation data whose importance is low is stored in the ordinary folder so that the situation data is classified and stored in accordance with the importance, it is possible to decrease the time required for data analysis.

The present claimed invention is not limited to the above-mentioned embodiment. For example, in case that the acceleration selected by the data administration section 804 as exceeding the judgment criterion is caused by an event whose importance is high such as an accident, the manual switch 5 may be so arranged to be turned on. In case that the manual switch 5 is turned on, the judgment criterion parameter storage section 805 may be so arranged not to update the data of the judgment criterion parameter. In addition, the input device is not limited to the manual switch. For example, it may be a voice recognition section or other various input devices.

Furthermore, the situation data obtained by the driving recorder 1 may include information on a brake such as a time period while the brake pedal is pressed, a number of times to press the brake pedal or information on operation of a blinker.

The data judged by the data administrating section 804 is not limited to the selection data, and a judgment criterion may be used by appropriately combining the speed, opening or closing the door and halt of the electric power supplied from a main power source (battery). The accuracy for judgment can be further improved by using combined parameters resulting from multiple events.

In addition, the situation data storage section may store the situation data just in a chronological order without classifying the situation data in an order of importance.

It is a matter of course that the present claimed invention may be variously modified without departing from the spirit of the invention.

POSSIBLE APPLICATIONS IN INDUSTRY

With this invention, it is possible to provide a vehicle-mounted driving recorder that contributes to effective use of a memory and to facilitation of after-the-fact analysis on situation data by surely and correctly obtaining only the necessary situation data and that has a learning function so as to gradually improve accuracy for judgment in selecting the situation data.

The invention claimed is:

1. A driving recorder comprising:

a detection device that detects a situation of a vehicle, a situation data receiving section that receives situation data from the detection device and temporarily stores the situation data in a temporary data storage section specified in a predetermined area of a memory, a data administration section that determines the situation of the vehicle detected by the detection device, and when a plurality of contents indicated by the received situation data satisfy a previously specified given condition, transfers a part or all of the situation data during a certain time period before and after a time when the condition is satisfied from the temporary data storage section to a situation data storage section specified in another predetermined area of the memory, a judgment criterion parameter storage section that stores data of a parameter to be a criterion for transferring the situation data from the temporary date storage section to the situation data storage section in the data administration section, an alert device that informs the driver that the situation is judged to exceed the judgment criterion by the data administration section, and an input device that inputs whether or not the judgment by the data administration section is appropriate, wherein the judgment criterion parameter storage section updates the data of the parameter based on whether or not the input is made by the input device, wherein the input device enables a driver to enter data indicating the judgment by the data administration section is not appropriate and the data administration section is enabled to alter one or more parameters of the judgment criterion parameters storage section in response to the data entered by the input device.

2. The driving recorder described in claim 1, and comprising a situation data storage section that classifies the situation data of the vehicle based on whether or not the input is made by the input device and that stores the classified situation data.

3. The driving recorder described in claim 2, wherein at least one or all of speed data indicating a speed of the vehicle, brake data indicating whether a brake of the vehicle is applied or not, door open/close data indicating whether a door is open or closed and main electric power source situation data indicating whether or not electric power is supplied from an electric power source at a side of the vehicle are included as the situation data.

4. The driving recorder described in claim 2, and further comprising:

a communication device that radio-transmits the situation data in the situation data storage section to a central computer arranged at a place different from the place where the vehicle locates at a time when the vehicle locates in a specified place where radio-communication to the central computer is capable.

5. The driving recorder described in claim 2, wherein at least acceleration data indicating acceleration applied to the vehicle, position data indicating a position of the vehicle and moving image data indicating an outside picture of the vehicle are included as the situation data.

6. The driving recorder described in claim 1, wherein the detection device is an acceleration sensor that detects acceleration applied to the vehicle and that outputs acceleration data indicating the acceleration as one of the situation data.

7. The driving recorder described in claim 1 further including an auxiliary electric power source wherein electric power can be supplied by the auxiliary electric power source when electric power supplied from an electric power source in a vehicle is halted, wherein the data administration section is enabled to utilize the auxiliary electric power source upon a detection of halting of an output of power from the vehicle power source.

8. The driving recorder described in claim 7 and further comprising:

a communication device that radio-transmits the stored situation data in the data storage section to a central computer arranged at a place different from the place where the vehicle is located at a time when the vehicle is capable of radio-communication to the central computer.

9. The driving recorder described in claim 8 wherein at least acceleration data indicating acceleration applied to the vehicle, position data indicating a position of the vehicle and moving image data indicating an outside picture of the vehicle are included as situation data.

* * * * *